(12) United States Patent
Lee et al.

(10) Patent No.: US 12,456,731 B2
(45) Date of Patent: Oct. 28, 2025

(54) SLURRY COMPOSITION FOR POSITIVE ELECTRODE FOR LITHIUM SECONDARY BATTERY, AND POSITIVE ELECTRODE AND LITHIUM SECONDARY BATTERY COMPRISING SAME

(71) Applicant: LG ENERGY SOLUTION, LTD., Seoul (KR)

(72) Inventors: Choonghyeon Lee, Daejeon (KR); Taek Gyoung Kim, Daejeon (KR); Mijin Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 792 days.

(21) Appl. No.: 17/790,053

(22) PCT Filed: Oct. 8, 2021

(86) PCT No.: PCT/KR2021/013848
§ 371 (c)(1),
(2) Date: Jun. 29, 2022

(87) PCT Pub. No.: WO2022/080766
PCT Pub. Date: Apr. 21, 2022

(65) Prior Publication Data
US 2023/0016691 A1 Jan. 19, 2023

(30) Foreign Application Priority Data
Oct. 12, 2020 (KR) .................. 10-2020-0130788

(51) Int. Cl.
*H01M 4/62* (2006.01)
*H01M 4/02* (2006.01)
(Continued)

(52) U.S. Cl.
CPC ........... *H01M 4/62* (2013.01); *H01M 4/0402* (2013.01); *H01M 10/0525* (2013.01);
(Continued)

(58) Field of Classification Search
None
See application file for complete search history.

(56) References Cited

U.S. PATENT DOCUMENTS

| | | |
|---|---|---|
| 3,803,128 A | 4/1974 | Lanz et al. |
| 2004/0009399 A1 | 1/2004 | Kim et al. |
| (Continued) | | |

FOREIGN PATENT DOCUMENTS

| | | |
|---|---|---|
| CN | 105118999 A | 12/2015 |
| CN | 109346671 A | 2/2019 |
| (Continued) | | |

OTHER PUBLICATIONS

Sanandiya, et al. (2016). "Cellulose-Based Spreadable New Thixo Gels: Synthesis and Their Characterization," RSC Adv. vol. 6, pp. 92953-92961.
(Continued)

*Primary Examiner* — Ryan S Cannon
*Assistant Examiner* — Karen J. Armstrong
(74) *Attorney, Agent, or Firm* — Bryan Cave Leighton Paisner LLP

(57) ABSTRACT

The present disclosure relates to a slurry composition for a positive electrode for a lithium secondary battery, and a positive electrode and a lithium secondary battery including the same, and more particularly, when manufacturing the positive electrode for the lithium secondary battery including slurry coating process, it is possible to increase the processability during the manufacture of the positive electrode for the lithium secondary battery, by manufacturing the positive electrode using a slurry composition for positive electrode with thixotropy that can secure flowability to an extent that can respond flexibly to changes in the coating speed of the slurry.

15 Claims, 2 Drawing Sheets

(51) Int. Cl.
H01M 4/04 (2006.01)
H01M 4/38 (2006.01)
H01M 4/58 (2010.01)
H01M 10/0525 (2010.01)

(52) U.S. Cl.
CPC ........ *H01M 2004/028* (2013.01); *H01M 4/38* (2013.01); *H01M 4/5815* (2013.01)

(56) References Cited

U.S. PATENT DOCUMENTS

| | | |
|---|---|---|
| 2016/0172679 A1 | 6/2016 | Han et al. |
| 2017/0309896 A1 | 10/2017 | Jeong et al. |
| 2020/0091500 A1 | 3/2020 | Nishitani et al. |
| 2021/0175501 A1 | 6/2021 | Han et al. |
| 2021/0175505 A1 | 6/2021 | Kim et al. |

FOREIGN PATENT DOCUMENTS

| | | |
|---|---|---|
| CN | 111554895 A | 8/2020 |
| JP | 2000-082472 A | 3/2000 |
| JP | 2001-135305 A | 5/2001 |
| JP | 2001-143711 A | 5/2001 |
| JP | 2004-047462 A | 2/2004 |
| JP | 2005-228679 A | 8/2005 |
| JP | 2006-172992 A | 6/2006 |
| JP | 2007-066823 A | 3/2007 |
| JP | 2021-504899 A | 2/2021 |
| JP | 2021-508919 A | 3/2021 |
| KR | 10-2016-0071740 A | 6/2016 |
| KR | 10-2017-0120973 A | 11/2017 |
| WO | 2014104005 A1 | 7/2014 |

OTHER PUBLICATIONS

Wang, et al. (2012). "CMC As a Binder in LiNi0.4Mn1.6O4 5 V Cathodes and Their Electrochemical Performance for Li-ion Batteries," Electrochimica Acta, vol. 62, pp. 77-83.

Qiu, et al. (2014). "Novel Polymer Li-ion Binder Carboxymethyl Cellulose Derivative Enhanced Electrochemical Performance for Li-ion Batteries," Carbohydrate Polymers. vol. 112, pp. 1-23.

Kil, et al. (2015). "Lithium Salt of Carboxymethyl Cellulose As An Aqueous Binder For Thick Graphite Electrode In Lithium ion Batteries," Macromolecular Research. vol. 23, No. 8, pp. 719-725.

Wei, et al. "Poly (acrylic acid sodium) Grafted Carboxymethyl Cellulose as a High Performance Polymer Binder For Silicon Anode in Lithium Ion Batteries," Scientific Report. vol 6. 19583, pp. 1-8.

Chen et al. (2015). "All-Aqueous Directed Assembly Strategy for Forming High-Capacity, Stable Silicon/Carbon Anodes for Lithium-Ion Batteries", ACS Applied Materials and Interfaces, vol. 7, pp. 21391-21397.

[Figure 1]
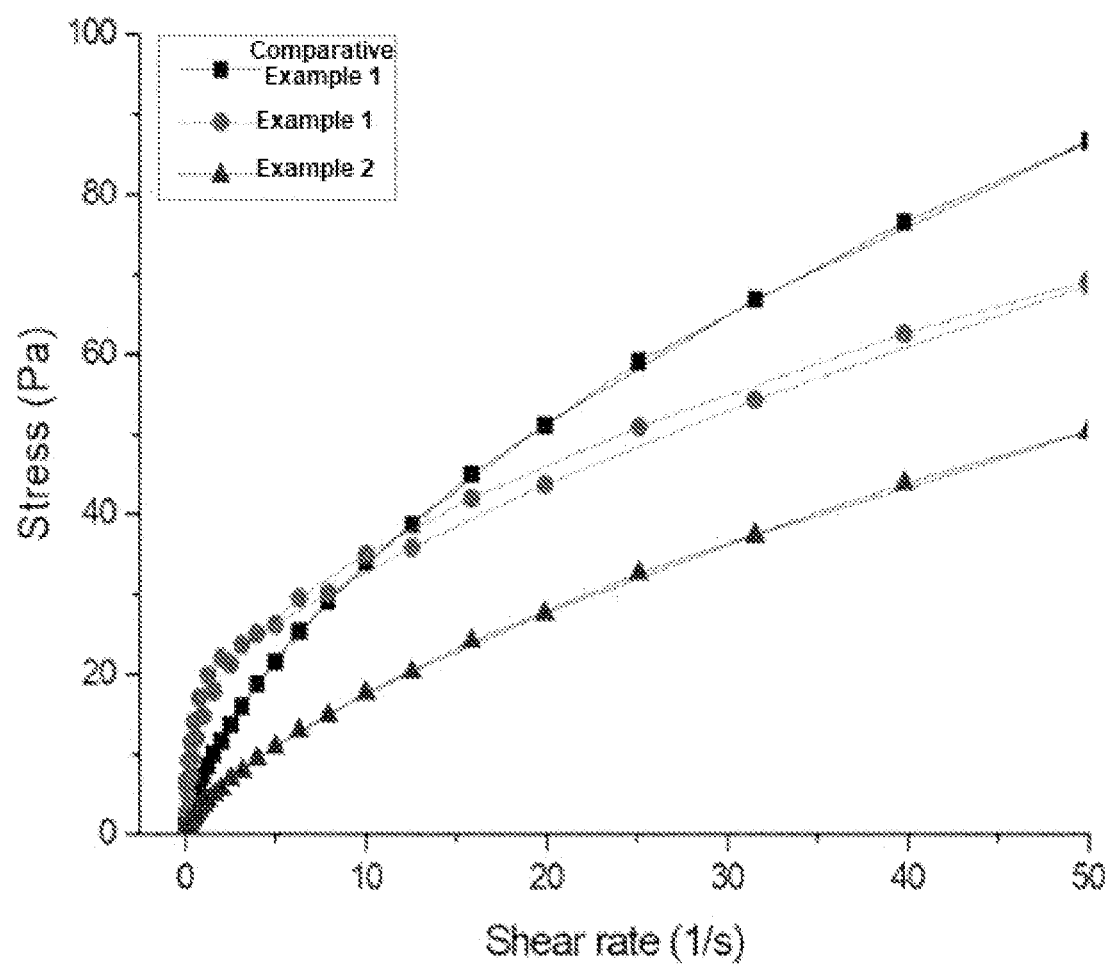

【Figure 2】
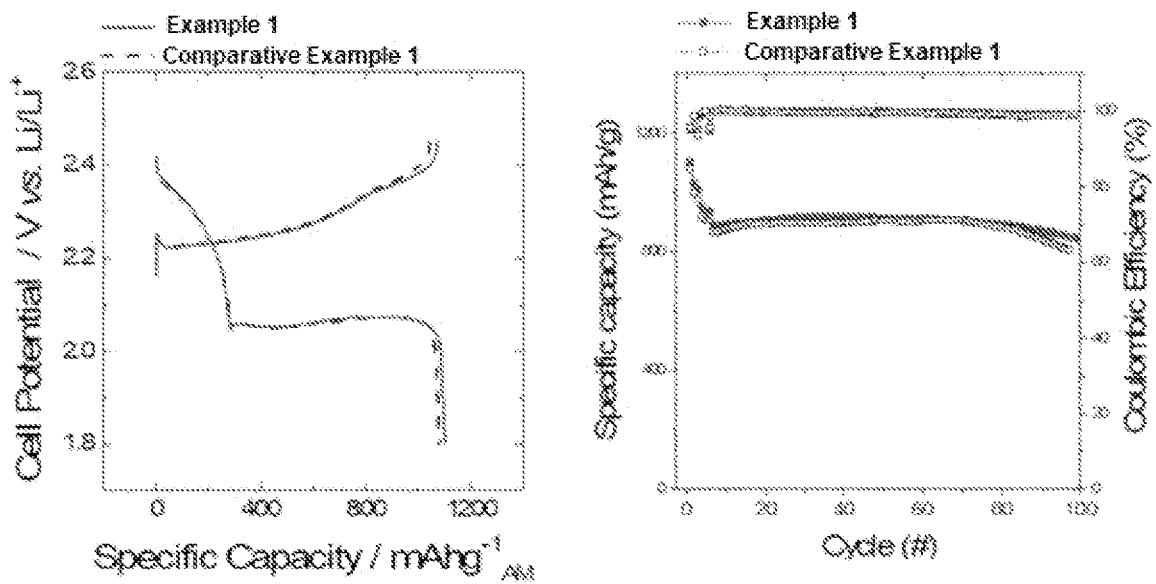
【Figure 3】
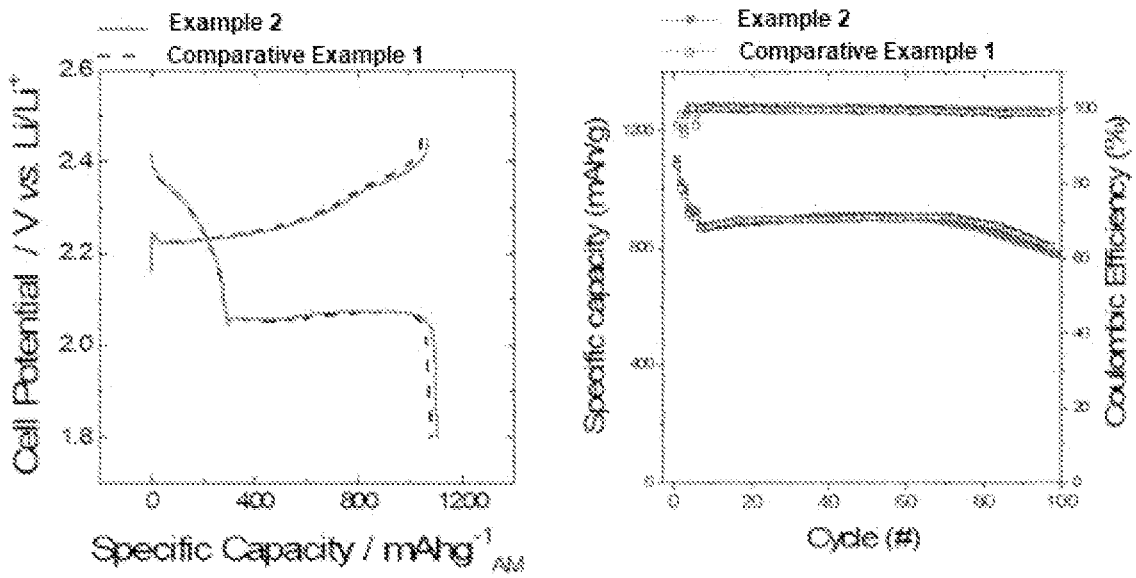

SLURRY COMPOSITION FOR POSITIVE ELECTRODE FOR LITHIUM SECONDARY BATTERY, AND POSITIVE ELECTRODE AND LITHIUM SECONDARY BATTERY COMPRISING SAME

CROSS CITATION WITH RELATED APPLICATIONS

The present application is a National Phase entry pursuant to 35 U.S.C. § 371 of International Application No. PCT/KR2021/013848, filed on Oct. 8, 2021, and claims priority to and the benefit of Korean Patent Application No. 2020-0130788, filed on Oct. 12, 2020, the entire contents of which are incorporated herein by reference in their entirety.

TECHNICAL FIELD

The present invention relates to a slurry composition for a positive electrode for a lithium secondary battery, and a positive electrode and a lithium secondary battery comprising the same.

BACKGROUND

Recently, with the rapid development in the field of electronic devices and electric vehicles, the demand for secondary batteries is increasing. In particular, with the trend of miniaturization and weight reduction of portable electronic devices, the demand for secondary batteries having a high energy density capable of responding thereto is increasing.

Among secondary batteries, a lithium-sulfur secondary battery is a secondary battery using a sulfur-based compound having a sulfur-sulfur bond as a positive electrode active material, and using an alkali metal such as lithium, a carbon-based material in which intercalation and deintercalation of metal ions such as lithium ions occur, or silicon or tin that forms an alloy with lithium, as a negative electrode active material. Specifically, the lithium-sulfur secondary battery stores and generates electrical energy by using the oxidation-reduction reaction in which during the discharging which is a reduction reaction, the oxidation number of sulfur is reduced while sulfur-sulfur bonds are broken, and during the charging which is an oxidation reaction, the sulfur-sulfur bond is formed again while the oxidation number of sulfur is increased.

In particular, since sulfur used as a positive electrode active material in lithium-sulfur secondary battery has a theoretical energy density of 1,675 mAh/g, which is 5 times higher than the positive electrode active material used in the conventional lithium secondary battery, the lithium-sulfur secondary battery is a battery capable of expressing high power and high energy density. In addition, since sulfur has the advantages of low cost, rich reserves, easy supply, and environmental friendliness, sulfur is attracting attention as an energy source for medium and large devices such as electric vehicles as well as portable electronic devices.

However, since sulfur has an electrical conductivity of $5 \times 10^{-30}$ S/cm, which is an insulator without electrical conductivity, there is a problem that the movement of electrons generated by the electrochemical reaction is difficult. Accordingly, sulfur is compounded with an electrically conductive material such as carbon that can provide electrochemical reaction sites, and the sulfur-carbon composite produced thereby is used.

In order to use the sulfur-carbon composite as a positive electrode material, a method of manufacturing a positive electrode through a slurry process of preparing a slurry using the sulfur-carbon composite, an electrically conductive material, a binder, and a thickening agent, and then applying the slurry to a current collector is generally used.

However, the conventional slurry for positive electrode for lithium-sulfur secondary battery had low thixotropy, so sufficient flowability was not ensured when applying the slurry for positive electrode to the solution coating process. Accordingly, in the manufacture process of the slurry for positive electrode, a dispersion agent and/or a rheology modifier that is friendly to the sulfur-carbon composite, which is a positive electrode active material, are sometimes used, but even if they are used, there is no significant change in flowability, and rather the performance of charging/discharging was weakened due to the use of the dispersion agent and/or the rheology modifier.

On the other hand, recently, research results for improving the flowability of the slurry for positive electrode by applying a carboxymethyl cellulose-based material as a binder in the preparation of a composition for the positive electrode have been published.

For example, Korean Laid-open Patent Publication No. 2016-0071740 comprises carboxymethyl cellulose (CMC) as a binder when preparing the composition for positive electrode in order to provide the aqueous composition for positive electrode to impart stable and flexible properties to the electrode plate. However, if only carboxymethyl cellulose is used as a binder, the slurry with low thixotropy does not spread properly when the coating speed is changed in the slurry coating process, so there is a problem that a positive electrode active material layer cannot be formed uniformly.

Lei Qui et al., (Carbohydrate polymers, Vol. 112, (2014) pp. 532-538) discloses a composition for positive electrode for a lithium secondary battery, which contains lithiated carboxymethyl cellulose (LiCMC) as a binder. However, if only the lithiated carboxymethyl cellulose is used as a binder, the thixotropy is also weak during the preparation of the slurry for positive electrode, and thus when the coating speed is changed in the coating process of the positive electrode active material layer, it cannot properly correspond to the composition for the positive electrode, so there is a problem that the positive electrode active material layer cannot be uniformly formed.

As such, in order to improve the processability in manufacturing a positive electrode for a lithium secondary battery and to improve the charging/discharging performance of the manufactured lithium secondary battery, studies to improve the rheological physical properties of the slurry for positive electrode are continuously being conducted. However, the slurry for positive electrode developed so far does not show a significant effect on the improvement of the processability in the manufacture of the positive electrode for the lithium secondary battery and the battery performance.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

PRIOR ART DOCUMENT

Patent Document (Patent Document 1) Korean Patent Publication No. 2016-0071740
(Non-Patent Document 2) Lei Qui et al., (Carbohydrate polymers, Vol. 112, (2014) pp. 532-538).

DISCLOSURE

Technical Problem

As a result of various studies conducted by the inventors of the present invention to solve the above problems, the inventors of the present invention have confirmed that when mixing the slurry composition for the positive electrode for the lithium secondary battery with lithiated carboxymethyl cellulose (LiCMC), which is a thickening agent, and LiCMC to which an aminobenzoic acid group is bonded (LiCMC-ABA), which is an additive, since the flowability of the slurry composition for positive electrode is improved, it is possible to form a positive electrode active material layer with excellent quality even if the coating speed is changed in the coating process of the slurry composition for positive electrode during manufacturing of the positive electrode.

Therefore, it is an object of the present invention to provide a slurry composition for positive electrode for the lithium secondary battery that has excellent flowability and thus can flexibly respond to variable process conditions during coating of the slurry.

It is another object of the present invention to provide a positive electrode prepared using the slurry composition for positive electrode having excellent flowability and a method for manufacturing the same.

It is still another object of the present invention to provide a lithium secondary battery including a positive electrode prepared using the slurry composition for positive electrode having excellent flowability.

It is still another object of the present invention to provide a battery module and/or a device including the lithium secondary battery.

Technical Solution

In order to achieve the above objects, the present invention provides a slurry composition for positive electrode for a lithium secondary battery, comprising a positive electrode active material, an electrically conductive material, a binder, a thickening agent, an additive, and a solvent, wherein the thickening agent comprises lithiated carboxymethyl cellulose (LiCMC), and wherein the additive comprises LiCMC to which an aminobenzoic acid group is bonded (LiCMC-ABA).

The present invention also provides a positive electrode for a lithium secondary battery, comprising a positive electrode current collector; and a positive electrode active material layer formed on one surface of the positive electrode current collector, wherein the positive electrode active material layer is formed by the slurry composition for positive electrode.

The present invention also provides a method for manufacturing a positive electrode for a lithium secondary battery comprising the steps of (S1) coating the slurry composition for positive electrode on one surface of the positive electrode current collector; (S2) drying the coating layer formed in step (S1); and (S3) pressing the coating layer to form a positive electrode active material layer.

The present invention also provides a lithium secondary battery comprising the above-described positive electrode, a negative electrode, a separator and an electrolyte solution.

The present invention also provides a battery module comprising the above-described lithium secondary battery.

The present invention also provides a device comprising the above-described lithium secondary battery.

Advantageous Effects

Since the slurry composition for positive electrode according to the present invention has flowability to an extent capable of flexibly responding to changing coating speed during the coating process, it is possible to manufacture a positive electrode in which a uniform positive electrode active material layer is formed on the positive electrode current collector using the slurry composition for positive electrode.

In addition, the lithium secondary battery comprising the positive electrode prepared using the slurry composition for positive electrode having excellent flowability shows the effect of improved charging/discharging performance.

BRIEF DESCRIPTION OF DRAWINGS

FIG. 1 is a graph showing the change in shear stress of the slurry compositions for positive electrode of Examples 1 and 2 and Comparative Example 1 depending on the shear rate.

FIG. 2 is a graph showing charging/discharging characteristics of the lithium-sulfur secondary batteries of Example 1 and Comparative Example 1.

FIG. 3 is a graph showing charging/discharging characteristics of the lithium-sulfur secondary batteries of Example 2 and Comparative Example 1.

DETAILED DESCRIPTION

Hereinafter, the present invention will be described in more detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

As used herein, the term "thixotropy" refers to the property of increasing viscosity when shear stress is not applied to a material and reducing viscosity when shear stress is applied to the material.

As used herein, "solids" refers to the positive electrode active material, the electrically conductive the material, the binder, the thickening agent, and the additive excluding the solvent in the slurry composition for positive electrode for the lithium secondary battery.

Slurry Composition for Positive Electrode for Lithium Secondary Battery

The present invention relates to a slurry composition for positive electrode having flowability to an extent capable of flexibly responding to changing coating speed during the coating process to form a positive electrode active material layer, when manufacturing a positive electrode for a lithium secondary battery. In this case, the term "responding" means that when the coating speed is increased, since the shear stress applied to the slurry composition for positive electrode between the current collector, on which the coating material is coated, and the coating bar is increased, the viscosity of the slurry composition for positive electrode is reduced to form a uniform coating while matching the fast coating speed, and when the coating speed is reduced, since the shear stress applied to the slurry composition for positive electrode between the current collector and the coating bar is reduced, the viscosity of the slurry composition for positive electrode is increased to form a uniform coating while matching the slow coating speed.

The slurry composition for positive electrode for the lithium secondary battery according to the present invention includes a positive electrode active material, an electrically conductive material, a binder, a thickening agent, an additive, and a solvent, wherein the thickening agent comprises lithiated carboxymethyl cellulose (LiCMC), and the additive comprises LiCMC to which an aminobenzoic acid group is bonded (LiCMC-ABA).

The slurry composition for positive electrode for lithium secondary battery contains LiCMC to which an aminobenzoic acid group is bonded (LiCMC-ABA) as an additive, and thus exhibits physical properties of improved thixotropy and thus good storage property. Considering the effect of improving the storage property by improving the thixotropy of the slurry composition for positive electrode, the aminobenzoic acid group may be a meta-aminobenzoic acid group. In the case of the slurry having the increased thixotropy, the ability to maintain viscosity is increased even during storage without shear stress, resulting in less change in composition at the top/bottom of the slurry over time, and thus the storage property can be improved. If a change in composition at the top/bottom of the slurry occurs, the inside composition at the top/bottom of the slurry is different, the coating may proceed non-uniformly during coating of the slurry.

Hereinafter, the present invention will be described in more detail focusing on each component of the slurry composition for positive electrode for the lithium secondary battery.

In the present invention, the positive electrode active material may include one or more selected from the group consisting of elemental sulfur ($S_8$), $Li_2S$, (n≥1, n is an integer), organic sulfur compound, and carbon-sulfur polymer [$(C_2S_x)_n$, 2.5≤x≤50, n≥2, x and n are integers]. Preferably, the positive electrode active material may comprise elemental sulfur.

In addition, the positive electrode active material may be contained in an amount of 60 wt. % to 97 wt. % based on the total weight of the solids in the slurry composition for positive electrode. Specifically, the content of the positive electrode active material may be 60 wt. % or more, 70 wt. % or more, or 80 wt. % or more, and 91 wt. % or less, 93 wt. % or less, or 97 wt. % or less. If the content of the positive electrode active material is less than 60 wt. %, the battery capacity of the entire cell may be reduced. If the content is more than 97 wt. %, the content of one or more of the electrically conductive material, the binder, the thickening agent, and the additive except for the positive electrode active material is relatively decreased, and thus the flowability, conductivity, or physical properties of the slurry composition for positive electrode may be reduced.

In addition, the electrically conductive material is for improving electrical conductivity, and there is no particular limitation as long as it is an electrically conductive material that does not cause chemical change in a lithium secondary battery.

The electrically conductive material may comprise one or more selected from the group consisting of carbon black, graphite, carbon fiber, carbon nanotube, metal powder, an electrically conductive metal oxide, and an organic electrically conductive material. The carbon black may comprise one or more selected from the group consisting of Ketjen black, super P, Denka black, acetylene black, and furnace black.

The electrically conductive material may be contained in an amount of 0.01 to 30 wt. % based on the total weight of solids in the slurry composition for positive electrode. Specifically, the content of the electrically conductive material may be 0.01 wt. % or more, 2 wt. % or more, or 4 wt. % or more, and may be 10 wt. % or less, 20 wt. % or less, or 30 wt. % or less. If the content of the electrically conductive material is less than 0.01 wt. %, the conductivity of the positive electrode may be reduced. If the content is more than 30 wt. %, the flexibility of the positive electrode may be reduced.

In addition, the binder maintains the positive electrode active material in the positive electrode current collector, and organically connects between the positive electrode active materials to increase the binding force between them, and all binders known in the art can be used as the binder.

The binder may be one selected from the group consisting of fluorine resin-based binders comprising polyvinylidene fluoride (PVdF) and/or polytetrafluoroethylene (PTFE); rubber-based binders comprising one or more of styrene butadiene rubber (SBR), acrylonitrile-butadiene rubber, and styrene-isoprene rubber; cellulose-based binders comprising one or more of carboxyl methyl cellulose (CMC), starch, hydroxypropyl cellulose and regenerated cellulose; polyalcohol-based binders; polyolefin-based binders comprising one or more of polyethylene and polypropylene; polyimide-based binders; polyester-based binder; acrylic-based binders comprising an acrylic monomer; and silane-based binders, or a mixture or copolymer of two or more thereof. According to one embodiment of the present invention, the binder may preferably be a combination of rubber-based binders. In addition, the binder may comprise SBR and/or acryl-based binders when considering compatibility with the carboxymethylcellulose-based thickening agent.

In addition, the binder may be an emulsion binder. In general, the shape of the positive electrode binder may be used in the form of a linear polymer as long as it can combine the components in the positive electrode, and is not particularly limited. However, when the emulsion binder is used, the components of the positive electrode can be most effectively combined in dots and in the form of dots, and the adhesive force is also good. In addition, when the emulsion binder is used, there is an effect of increasing the amount of solids in the slurry compared to a binder in the form of a linear polymer.

In addition, the binder may be contained in an amount of 0.01 to 30 wt. % based on the total weight of solids in the slurry composition for positive electrode. Specifically, the content of the binder may be 0.01 wt. % or more, 1 wt. % or more, or 2 wt. % or more, and 10 wt. % or less, 20 wt. % or less, or 30 wt. % or less. If the content of the binder is less than 0.01 wt. %, physical properties, such as binding force, of the positive electrode may be deteriorated, and thus the positive electrode active material and the electrically conductive material may be removed. If the content is more than 30 wt. %, the ratio of the positive electrode active material and the electrically conductive material is relatively reduced, so that the battery capacity can be reduced.

In addition, the thickening agent can secure the stability of the slurry composition for positive electrode by imparting appropriate viscosity to the slurry composition for positive electrode, and when coating the slurry composition for positive electrode on the positive electrode current collector, can improve the surface defect by alleviating the re-aggregation of solids.

The thickening agent may include lithiated carboxymethyl cellulose (LiCMC). The LiCMC may be represented by the following Formula 1:

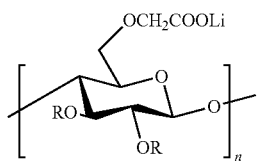

<Formula 1>

The LiCMC may be obtained by substituting Li for metal ions in conventional CMC. Metal ions contained in conventional CMC may act as impurities inside the cell and thus may degrade cell performance, whereas LiCMC excludes such impurities inside the cell and contains lithium ions and thus degradation in cell performance due to impurities can be minimized.

In addition, since the LiCMC is used together with LiCMC to which an aminobenzoic acid group containing an amino group is bonded (LiCMC-ABA), the interaction (hydrogen bonding) inside the slurry is changed and thus the thixotropy corresponding to the shear stress is improved. In addition, the LiCMC and LiCMC-ABA basically maintain the CMC backbone, and thus when mixing LiCMC and LiCMC-MABA, for example, agglomeration can be prevented.

In addition, the thickening agent may be contained in an amount of 0.5 wt. % to 5 wt. % based on the total weight of solids in the slurry composition for positive electrode. Specifically, the content of the thickening agent may be 0.5 wt. % or more, 0.8 wt. % or more, or 1 wt. % or more, and 2 wt. % or less, 3 wt. % or less, or 5 wt. % or less. If the content of the thickening agent is less than 0.5 wt. %, since the viscosity of the slurry composition for positive electrode is low and thus the slurry composition flows down like water, the slurry composition for positive electrode cannot be coated on the positive electrode current collector. If the content is more than 5 wt. %, since the viscosity is high and the slurry composition is stiff, it may be difficult to form a uniform coating layer.

The viscosity of the slurry composition for positive electrode is not particularly limited, and the viscosity may vary depending on the content of the thickening agent. However, considering the stability of the phase of the slurry composition for the positive electrode phase and the ease of the coating process, the viscosity can be 1000 cP or more or 4500 cP or more at 25° C.

In addition, the additives can render the slurry composition for positive electrodes to have thixotropy that allows the slurry composition for positive electrode to respond to variable coating speed in the coating process of coating it on the positive electrode current collector, when manufacturing positive electrode.

The additive comprises LiCMC to which an aminobenzoic acid group is bonded (LiCMC-ABA), and the LiCMC-ABA may comprise one or more selected from the group consisting of LiCMC to which a meta-aminobenzoic acid group is bonded (LiCMC-MABA) and LiCMC to which a para-aminobenzoic acid group is bonded (LiCMC-PABA). The LiCMC-MABA may be represented by Formula 2b below, and the following LiCMC-PABA may be represented by Formula 2a below:

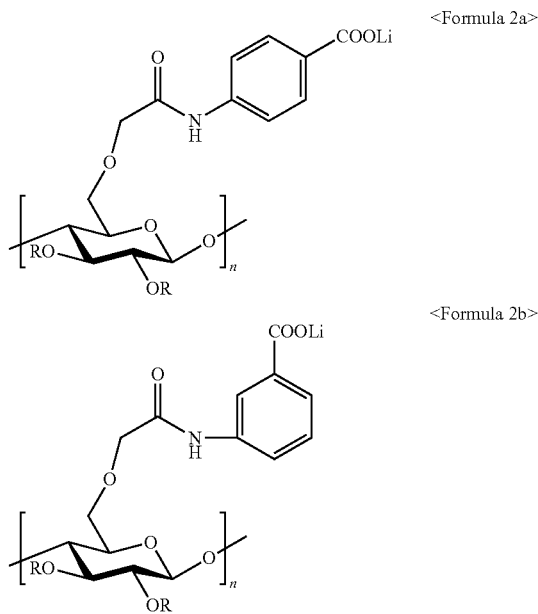

<Formula 2a>

<Formula 2b>

In addition, the additives LiCMC (LiCMC-MABA) and LiCMC (LiCMC-PABA) have a structure formed by bonding an aminobenzoic acid group to LiCMC. In the case of conventional CMC-PABA and CMC-MABA, H is present in the COOH group, but in the case of LiCMC (LiCMC-MABA) and LiCMC (LiCMC-PABA), H in the COOH group is substituted with Li to increase the number of Li ions and to prevent electrochemical side reactions by H.

In addition, the additive may be contained in an amount of 0.01 wt. % to 5 wt. % based on the total weight of solids in the slurry composition for positive electrode. Specifically, the content of the additive may be 0.01 wt. % or more, 0.1 wt. % or more, or 0.3 wt. % or more, and may be 1.5 wt. % or less, 3 wt. % or less, or 5 wt. % or less. If the content of the additive is less than 0.01 wt. %, the thixotropy of the slurry composition for positive electrode is not good, and thus when the coating speed is changed during the coating process, it may be difficult to form a coating layer having a uniform thickness. If the content is more than 5 wt. %, the thixotropy is excessive and thus the stability of the slurry composition for positive electrode is not good, so cracks may occur after the formation of the coating layer.

In addition, the solvent may be used without particular limitation as long as it is a solvent capable of forming a slurry composition for positive electrode by mixing with the positive electrode active material, the electrically conductive material, the binder, the thickening agent and the additive as described above.

The solvent may comprise an organic solvent and/or an aqueous solvent. The organic solvent may comprise one or more selected from the group consisting of N-methyl-2-pyrrolidone (NMP), methoxy propyl acetate, butyl acetate, glycol acid, butyl ester, butyl glycol, methyl alkyl polysiloxane, alkylbenzene, propylene glycol, xylene, monophenyl glycol, aralkyl modified methylalkyl polysiloxane, polyether modified dimethyl polysiloxane copolymer, polyacrylate, alkylbenzene, diisobutyl ketone, organic modified polysiloxane, butanol, isobutanol, modified polyacrylate, modified polyurethane, and polysiloxane-modified polymer. The aqueous solvent may comprise water.

The content of the solvent may be 55 to 70 wt. % based on the total weight of the slurry composition for positive electrode. Specifically, the content of the solvent may be 55 wt. % or more or 57 wt. % or more, and 65 wt. % or less, 67 wt. % or less, or 70 wt. % or less. If the content of the solvent is less than 55 wt. %, since the concentration of the slurry composition for positive electrode is excessively high and thus the slurry composition is stiff, it may be difficult to uniformly coat the slurry composition for positive electrode on the positive electrode current collector. If the content is more than 70 wt. %, since the concentration of the slurry composition for positive electrode is excessively low and the slurry composition flows down, it may be difficult to control the slurry composition for positive electrode in the coating process and it may take a long time to dry after forming the coating layer.

In the present invention, the slurry composition for positive electrode may have a thixotropy index (T) of 0.1 to 0.4 expressed by Equation 1 below:

Thixotropy index(T)=(Viscosity of slurry composition for positive electrode at rotation speed of 10 rpm)/(Viscosity of slurry composition for positive electrode at rotation speed of 1 rpm),   <Equation 1> wherein the viscosity was measured at 25° C.

The slurry composition for positive electrode has thixotropy which is a property that causes the viscosity to increase when shear stress is not applied and viscosity to decrease when shear stress is applied.

By using the principle that shear stress is applied by the shear rate proportional to the rotation speed when rotating the slurry composition for positive electrode, the thixotropy was defined using the viscosity of the slurry composition for positive electrode at 10 rpm of rotation speed relative to the viscosity of the slurry composition for positive electrode at 1 rpm of rotation speed, as shown in Equation 1. When the rotation speed is 1 rpm, the shear rate is 0.29/s, and when the rotation speed is 10 rpm, the shear rate is 2.9/s.

If the thixotropy index (T) is less than 0.1, the viscosity at high rotation speed is very low compared to low rotation speed, and thus when the coating speed is changed in the process of coating the slurry composition for positive electrode on the positive electrode current collector, the effective coating speed is limited. If the thixotropy index (T) exceeds 0.4, even when the coating speed is changed, the change in viscosity is not large, and thus it may make it difficult for the slurry to respond.

Method for Preparing Slurry Composition for Positive Electrode for Lithium Secondary Battery The present invention also relates to a method for preparing a slurry composition for positive electrode for a lithium secondary battery. The types and weights of materials used in the preparation of the slurry composition for positive electrode are as described above.

The slurry composition for positive electrode may be prepared by adding the positive electrode active material, the electrically conductive material, binder, the thickening agent and the additive as described above to a solvent, and mixing them.

The mixing may be carried out by milling, but is not particularly limited as long as it is a mixing method used for forming a slurry in the art. For example, the milling may be bead milling, roll milling, ball milling, attrition milling, planetary milling, jet milling, or screw mixing milling. Preferably, in consideration of the uniform mixing and dispersibility of the components contained in the slurry composition for positive electrode, bead milling can be applied.

Positive Electrode for Lithium Secondary Battery

The present invention also provides a positive electrode for a lithium secondary battery comprising a positive electrode current collector and a positive electrode active material layer formed on one surface of the positive electrode current collector, wherein the positive electrode active material layer comprises a positive electrode active material, a binder, an electrically conductive material, a thickening agent, and an additive.

In the present invention, the positive electrode current collector is not particularly limited as long as it has conductivity without causing a chemical change in the battery and can be used electrochemically stably at the charging voltage of the positive electrode. For example, the positive electrode current collector may be one or more selected from the group consisting of copper, aluminum, stainless steel, titanium, silver, palladium, nickel, alloys thereof, and combinations thereof. The stainless steel may be surface-treated with carbon, nickel, titanium or silver.

In addition, the shape of the positive electrode current collector is not particularly limited, and may be in the form of film, sheet, foil, net, porous body, foam, or nonwoven fabric. If necessary, fine irregularities may be formed on the surface of the positive electrode current collector, and the irregularities may help improve adhesive force with the positive electrode active material layer. The method of forming the irregularities on the surface of the positive electrode current collector is not particularly limited, and, for example, a known method such as a mechanical polishing method, an electrolytic polishing method, or a chemical polishing method may be applied.

In addition, the thickness of the positive electrode current collector is not particularly limited, and may be set in an appropriate range in consideration of the mechanical strength of the positive electrode, productivity, or capacity of the battery. For example, the thickness of the positive electrode current collector may be typically 3 μm to 500 μm.

In the present invention, the positive electrode active material layer may include the positive electrode active material formed by the slurry composition for positive electrode as described above, a binder, an electrically conductive material, a thickening agent and an additive. The types and contents of the positive electrode active material, the binder, the electrically conductive material, the thickening agent, and the additive are as described above.

The thickness of the positive electrode active material layer is not particularly limited, and may be set in an appropriate range in consideration of the mechanical strength of the positive electrode, the loading amount or the capacity of the battery. For example, the thickness of the positive electrode active material layer may be typically 30 μm to 300 μm.

Method of Manufacturing Positive Electrode for Lithium Secondary Battery

The present invention also relates to a method for manufacturing a positive electrode for a lithium secondary battery comprising the steps of (S1) coating the slurry composition for positive electrode on one surface of the positive electrode current collector; (S2) drying the coating layer formed in step (S1); and (S3) pressing the coating layer to form a positive electrode active material layer.

In step (S1), a coating layer may be formed by coating the slurry composition for positive electrode on one surface of the positive electrode current collector. The positive electrode current collector and the slurry composition for positive electrode are as described above.

The coating method is not particularly limited as long as it is a method capable of coating the slurry. For example, the coating method may be one or more selected from the group consisting of a bar coating method, a roll-to-roll coating method, a spin coating method, a nozzle printing method, an inkjet printing method, a slot coating method, and a dip coating method. Preferably, the coating method may be the roll-to-roll coating method.

In the coating process using the coating method as described above, the coating speed may be variable. Depending on the coating conditions, the coating speed may be changed to establish an optimized drying condition. The coating speed is variable because the drying speed of the solvent is different depending on the properties of the slurry composition for positive electrode in the process of applying the slurry composition for positive electrode to the current collector and drying it.

In step (S2), the coating layer formed in step (S1) may be dried.

Through the drying, the solvent contained in the slurry composition for positive electrode may be evaporated to form a coating layer having a layer shape.

The drying temperature may be 30° C. or more, 40° C. or more, or 45° C. or more, 60° C. or less, 70° C. or less, or 80° C. or less, so that a positive electrode active material layer having excellent quality can be formed.

In step (S3), the coating layer formed in step (S2) may be pressed to form a positive electrode active material layer.

The pressing may be introduced by a conventional pressing process used in the art, and the pressing may be performed using a roll press. For example, the pressing using the roll press may be performed by applying pressure to the positive electrode current collector having the coating layer formed thereon with the roll, and simultaneously moving the positive electrode current collector having the coating layer formed therein in a horizontal direction, in a state where two rolls are placed on the top and bottom of the positive electrode current collector on which the coating layer was formed.

Lithium Secondary Battery

The present invention also relates to a lithium secondary battery comprising a positive electrode, a negative electrode, a separator and an electrolyte solution.

In the lithium secondary battery according to the present invention, the structure, constituent materials, and manufacturing method of the positive electrode are as described above.

In the lithium secondary battery according to the present invention, the negative electrode may comprise a negative electrode current collector and a negative electrode active material layer formed on the negative electrode current collector. The negative electrode active material layer (for example, lithium foil) can be used alone.

The negative electrode current collector is not particularly limited as long as it has electrical conductivity without causing a chemical change in the battery. For example, copper, stainless steel, aluminum, nickel, titanium, sintered carbon, copper or stainless-steel surface-treated with carbon, nickel, titanium, silver or the like; aluminum-cadmium alloy or the like may be used as the negative electrode current collector. Also, as with the positive electrode current collector, the shape of the negative electrode current collector can be various forms such as a film having fine irregularities on its surface, a sheet, a foil, a net, a porous body, foam, a nonwoven fabric and the like.

In addition, the negative electrode active material may comprises, but is not limited to, one or more carbon-based material selected from the group consisting of crystalline artificial graphite, crystalline natural graphite, amorphous hard carbon, low crystalline soft carbon, carbon black, acetylene black, Ketjen black, Super-P, graphene, and fibrous carbon, Si-based material, metal composite oxides such as $Li_xFe_2O_3$ ($0 \le x \le 1$), $Li_xWO_2$ ($0 \le x \le 1$), $Sn_xMe_{1-x}Me'_yO_z$ (Me:Mn, Fe, Pb, Ge; Me':Al, B, P, Si, elements of groups 1, 2, and 3 of the periodic table, halogen; $0 < x \le 1$; $1 \le y \le 3$; $1 \le z \le 8$); lithium metal; lithium alloy; silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; an electrically conductive polymer such as polyacetylene; Li—Co—Ni based material; titanium oxide; lithium titanium oxide.

In addition, the negative electrode active material may be metal composite oxides such as $Sn_xMe_{1-x}Me'_yO_z$ (Me:Mn, Fe, Pb, Ge; Me':Al, B, P, Si, elements of groups 1, 2, and 3 of the periodic table, halogen; $0 < x \le 1$; $1 \le y \le 3$; $1 \le z \le 8$); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and may be carbon-based negative electrode active materials such as crystalline carbon, amorphous carbon, or carbon composite alone or in combination of two or more.

In the lithium secondary battery according to the present invention, any of those conventionally used in the manufacture of a lithium secondary battery can be used as an electrolyte solution.

The lithium salts that can be comprised as an electrolyte in the electrolyte solution can be used without limitation as long as they are those commonly used in the electrolyte solution for lithium secondary batteries. The anions of the lithium salts may comprise, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$. The lithium salt may be LiTFSI (Lithium bis(trifluoromethanesulfonyl)imide, $LiC_2F_6NO_4S_2$) and/or $LiNO_3$.

In the electrolyte solution used in the present invention, organic solvents included in the electrolyte solution can be used without limitation as long as they are those commonly used in electrolyte solutions for lithium secondary batteries. According to one embodiment of the present invention, the organic solvent may be a carbonate-based solvent, an ester-based solvent, an ether-based solvent, a ketone-based solvent, an alcohol-based solvent, or an aprotic solvent. Among them, the ether-based solvent may be typically used.

Examples of the carbonate-based solvent may specifically comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc.

Examples of the ester-based solvent may specifically comprise methyl acetate, ethyl acetate, n-propyl acetate, 1,1-dimethyl ethyl acetate, methyl propionate, ethyl propionate, γ-butyrolactone, decanolide, valerolactone, mevalonolactone, or caprolactone, etc.

The ether-based solvent may be specifically dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether, diglyme, triglyme, tetraglyme, tetrahydrofuran, 2-methyltetrahydrofuran, or polyethylene glycol dimethyl ether, etc.

Examples of the ketone-based solvent may specifically comprise cyclohexanone, etc. Examples of the alcohol-based solvent may specifically comprise ethylalcohol, or isopropylalcohol, etc.

Examples of the aprotic solvent may specifically comprise nitriles such as acetonitrile, amides such as dimethylformamide, dioxolanes such as 1,3-dioxolane (DOL), or sulfolane, etc.

The non-aqueous organic solvents may be used alone or in combination of one or more. The mixing ratio when using in combination of one or more can be appropriately adjusted depending on the desired performance of the battery.

In the lithium secondary battery according to the present invention, the separator may be a conventional porous polymer film used as a separator in the art. For example, as the separator, a porous polymer film made of a polyolefin-based polymer such as polyethylene, polypropylene, ethylene/butene copolymer, ethylene/hexene copolymer, and ethylene/methacrylate copolymer may be used alone or they may be laminated and used, or a conventional porous nonwoven fabric, for example, a non-woven fabric made of high melting glass fibers, polyethylene terephthalate fibers, or the like may be used, but is not limited thereto.

In the lithium secondary battery according to the present invention, the shape of the battery is not particularly limited and may be, for example, a jelly-roll type, a stack type, a stack-folding type (including a stack-Z-folding type), or a lamination-stacking type, and preferably a stack-folding type.

In addition, the lithium secondary battery may be manufactured by sequentially stacking the negative electrode, separator, and positive electrode, preparing an electrode assembly injected with an electrolyte solution, putting it in a battery case, and then sealing it with a cap plate and gasket.

In that case, the lithium secondary battery may be classified into various batteries such as a lithium-sulfur secondary battery, a lithium-air battery, a lithium-oxide battery, and a lithium all-solid-state battery depending on the material used for the positive electrode/negative electrode and may be also classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof is omitted.

In the present invention, the lithium secondary battery may be a lithium-sulfur secondary battery using a positive electrode material including a sulfur-carbon composite as a positive electrode. The lithium-sulfur secondary battery may use lithium metal as a negative electrode active material. During discharging of the lithium-sulfur secondary battery, oxidation reaction of lithium occurs at the negative electrode and reduction reaction of sulfur occurs at the positive electrode. At this time, the reduced sulfur is combined with lithium ions moved from the negative electrode to be converted into lithium polysulfide, and finally, a reaction to form lithium sulfide is accompanied.

Also, the present invention relates to a battery module including the lithium secondary battery, which can be used as a power source for devices requiring high capacity and high-rate characteristics, etc. Specific examples of the device may include, but are not limited to, a power tool that is powered by a battery powered motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

Hereinafter, it will be apparent to those skilled in the art that although the preferred embodiments are shown to facilitate understanding of the present invention, the following examples illustrate only the present invention and various changes and modifications may be made within the scope and spirit of the present invention. It is also natural that such variations and modifications are within the scope of the appended claims.

Example 1

(1) Preparation of Slurry Composition for Positive Electrode

The positive electrode active material, the electrically conductive material, the binder, the thickening agent and the additive were mixed in a weight ratio of 90:5:3.5:1.05:0.45 to obtain a mixture. The positive electrode active material was a S/CNT composite obtained by mixing sulfur (a product manufactured by Sigma-Aldrich) with CNT (Carbon Nanotube) using a ball mill and then heat-treating them at 155° C., the electrically conductive material was Denka Black, the binder was styrene-butadiene rubber (SBR), the thickening agent was LiCMC (LiCMC1000, GLchem), and the additive was LiCMC-MABA.

The mixture obtained and water were mixed to prepare a slurry composition for positive electrode.

(2) Manufacturing of Positive Electrode

The slurry composition for positive electrode was coated on one surface of the positive electrode current collector of aluminum foil (Al foil) of a thickness of 12 μm, drying and roll-pressing at 50° C. for 2 hours to obtain a positive electrode having the positive electrode active material layer formed.

(3) Manufacturing of Lithium-Sulfur Secondary Battery

A porous polyethylene separator having a thickness of 20 μm and a porosity of 45% was placed between the positive electrode and the lithium negative electrode and placed inside the case, and then electrolyte was injected into the case to form a lithium-sulfur secondary battery in the form of a CR-2032 coin cell.

The electrolyte was prepared by adding 0.38 M LiTFSI and 0.31 M LiNO$_3$ to a mixed solvent (1:1, v/v) of 1,3-dioxolane (DOL) and 1,2-dimethoxyethane (DME).

Example 2

A slurry composition for positive electrode, a positive electrode, and a lithium-sulfur secondary battery were prepared in the same manner as in Example 1, except that LiCMC-PABA instead of LiCMC-MABA was used as an additive.

Example 3

A slurry composition for positive electrode, a positive electrode, and a lithium-sulfur secondary battery were prepared in the same manner as in Example 1, except that the positive electrode active material, the electrically conductive material, the binder, the thickening agent and the additive were mixed in a weight ratio of 90:5:3.5:0.45:1.05 by reducing the weight of the thickening agent.

Example 4

A slurry composition for positive electrode, a positive electrode, and a lithium-sulfur secondary battery were prepared in the same manner as in Example 1, except that the positive electrode active material, the electrically conductive material, the binder, the thickening agent and the additive were mixed in a weight ratio of 85.55:5:3.5:5.5:0.45 by increasing the weight of the thickening agent.

Example 5

A slurry composition for positive electrode, a positive electrode, and a lithium-sulfur secondary battery were prepared in the same manner as in Example 1, except that the positive electrode active material, the electrically conductive material, the binder, the thickening agent and the additive were mixed in a weight ratio of 90:5:3.5:1.495:0.005 by reducing the weight of the additive.

Example 6

A slurry composition for positive electrode, a positive electrode, and a lithium-sulfur secondary battery were prepared in the same manner as in Example 1, except that the positive electrode active material, the electrically conductive material, the binder, the thickening agent and the additive were mixed in a weight ratio of 85:5:3.5:1:5.5 by increasing the weight of the additive.

Comparative Example 1

A slurry composition for positive electrode, a positive electrode, and a lithium-sulfur secondary battery were prepared in the same manner as in Example 1, except that the positive electrode active material, the electrically conductive material, the binder, and the thickening agent were mixed in a weight ratio of 90:5:3.5:1.5 without using the weight of the additive.

Comparative Example 2

A slurry composition for positive electrode, a positive electrode, and a lithium-sulfur secondary battery were prepared in the same manner as in Example 1, except that CMC (D2200, Daicel) instead of LiCMC (GB-Li1000, GLchem) was used as a thickening agent.

Experimental Example 1: Measurement of Viscosity, Thixotropy Index and Rheological Physical Properties of Slurry Composition for Positive Electrode For slurry compositions for positive electrode prepared in Examples and Comparative Examples, viscosity was measured, thixotropy index was calculated from the measured viscosity, and rheological physical properties were measured, and the results are shown in Table 1 and FIG. 1 below.

A method of measuring the viscosity, a method for calculating the thixotropy index and a method for measuring rheological physical properties are as described below.

(1) Viscosity Measurement 4 ml of the slurry composition for positive electrode was put into a container at 25° C., and an SCP-16 spindle (Brookfield) was installed in the container. Thereafter, the SCP-16 spindle was rotated at a speed of 1 rpm to 10 rpm, and the viscosity (cP) measured at each rotation speed was recorded. Viscometer (DV2T, Brookfield) was used as a viscometer for measuring viscosity.

(2) Calculation of Thixotropy Index

Using Equation 1 below, the thixotropy index of the slurry composition for positive electrode was calculated:

Thixotropy index (T)=(Viscosity of the slurry composition for positive electrode at rotation speed 10 rpm)/(Viscosity of the slurry composition for positive electrode at rotation speed 1 rpm),  <Equation 1> wherein the viscosity was measured at 25° C.

(3) Measurement of Rheological Physical Properties 1 g of the slurry composition for positive electrode was put into a rheometer (DHR-1, TA instruments), and then the shear stress (Pa) corresponding to the shear rate varying in the range of 0.1/s to 50/s was measured.

TABLE 1

| | Thickening agent | | Additive | | Viscosity according to rotation speed (cP) | | Thixotropy index (T) |
|---|---|---|---|---|---|---|---|
| | Kind | Content (wt. %) | Kind | Content (wt. %) | 1 rpm (0.29/s) | 10 rpm (2.9/s) | |
| Example 1 | LiCMC | 1.05 | LiCMC-MABA | 0.45 | 22320 | 6036 | 0.27 |
| Example 2 | LiCMC | 1.05 | LiCMC-PABA | 0.45 | 15480 | 4704 | 0.3 |
| Example 3 | LiCMC | 0.45 | LiCMC-MABA | 1.05 | 4320 | 1320 | 0.3 |
| Example 4 | LiCMC | 5.5 | LiCMC-MABA | 0.45 | 66360 | not measurable | not measurable |
| Example 5 | LiCMC | 1.495 | LiCMC-MABA | 0.005 | 6000 | 3100 | 0.52 |
| Example 6 | LiCMC | 1 | LiCMC-MABA | 5.5 | 12000 | not measurable | not measurable |
| Comparative Example 1 | LiCMC | 1.05 | — | — | 4920 | 2964 | 0.6 |
| Comparative Example 2 | CMC | 1.05 | LiCMC-MABA | 0.45 | 5100 | 2900 | 0.57 |

As shown in Table 1, it can be seen that in the case of Example 1, the slurry composition for positive electrode containing an appropriate amount of LiCMC-MABA as an additive had high viscosity and high thixotropy index.

Also, in the case of Example 2, the slurry composition for positive electrode containing an appropriate amount of LiCMC-PABA as an additive showed lower viscosity and similar thixotropy index compared to Example 1.

In addition, Example 3 is a case in which the content of the thickening agent is relatively lower than that of Example 1, and the thixotropy index is appropriate to appropriately respond to the change in speed in the slurry coating process. However, since the viscosity is low, the stability of the slurry composition for positive electrode may not be good, and since the slurry composition flows down like water, it may take a lot of time to coat the slurry composition for the positive electrode on the positive electrode current collector.

Also, Comparative Example 1 is a slurry composition for positive electrode that does not contain an additive, and does not provide the required viscosity to form the slurry, resulting in agglomeration of the slurry.

FIG. 1. is a graph showing the change in shear stress according to the shear rate of slurry compositions for positive electrode of Examples 1 and 2 and Comparative Example 1.

Referring to FIG. 1, the difference in the size of the inner area of the hysteresis loop can be confirmed, and from this, it can be seen that the slurry of Example 1 has excellent thixotropy properties.

Experimental Example 2: Evaluation of Charging/Discharging Characteristics

For lithium-sulfur secondary batteries of CR-2032 coin cell type manufactured by Examples and Comparative Examples, charging/discharging characteristics were evaluated by performing 0.1C charging/0.1C discharging three times and 0.3C charging/0.5C discharging within a voltage range of 1.8V to 2.5V.

FIG. 2 is a graph showing charging/discharging characteristics of lithium-sulfur secondary batteries of Example 1 and Comparative Example 1, and FIG. 3 is a graph showing charging/discharging characteristics of lithium-sulfur secondary batteries of Example 2 and Comparative Example 1.

Referring to FIG. 2, the lithium-sulfur battery of Example 1 showed an initial discharging capacity of 1105 mAh/g, which was higher than the discharging capacity of Comparative Example 1 of 1080 mAh/g, and showed lifetime performance maintaining a discharging capacity of 800 mAh/g or more over 100 cycles. This performance is equivalent to or superior to the maintenance of the discharging capacity of the lithium-sulfur battery of Comparative Example 1 without the additive.

Also, referring to FIG. 3, the lithium-sulfur battery of Example 2 also showed an initial discharging capacity of 1100 mAh/g, which was higher than the discharging capacity of Comparative Example 1 of 1080 mAh/g, and showed lifetime performance maintaining a discharging capacity of 770 mAh/g or more over 100 cycles. This performance is equivalent to the maintenance of the discharging capacity of the lithium-sulfur battery of Comparative Example 1 without the additive.

This indicates that charging/discharging performance does not deteriorate even when LiCMC-MABA and LiCMC-PABA, which are additives for the slurry for positive electrode of the lithium-sulfur secondary battery of the present invention, instead of LiCMC, are added.

These results are because the carboxyl group and the peptide group present in the aminobenzoic acid group effectively inhibited the leaching of sulfur-based substances into the electrolyte solution by helping the adsorption and reduction reaction of the polysulfide while maintaining the dispersibility with the existing LiCMC due to the chemical properties of LiCMC combined with an aminobenzoic acid group.

In the above, although the present invention has been described by limited examples and drawings, the present invention is not limited thereto, and of course, various modifications and variations are possible by those of ordinary skill in the art to which the present invention pertains within the scope of equivalents of the technical spirit of the present invention and the claims to be described below.

The invention claimed is:

1. A slurry composition for positive electrode for a lithium secondary battery, comprising:
   a positive electrode active material;
   an electrically conductive material;
   a binder;
   a thickening agent;
   an additive; and
   a solvent,
   wherein the thickening agent comprises lithiated carboxymethyl cellulose (LiCMC), and
   wherein the additive comprises LiCMC to which an aminobenzoic acid group is bonded (LiCMC-ABA).

2. The slurry composition for positive electrode for the lithium secondary battery according to claim 1, wherein the LiCMC to which the aminobenzoic acid group is bonded comprises one or more selected from the group consisting of LiCMC to which a meta-aminobenzoic acid group is bonded (LiCMC-MABA) and LiCMC to which a para-aminobenzoic acid group is bonded (LiCMC-PABA).

3. The slurry composition for positive electrode for the lithium secondary battery according to claim 1, wherein the thickening agent is contained in an amount of 0.5 wt. % to 5 wt. % based on the total weight of the solids of the slurry composition for positive electrode.

4. The slurry composition for positive electrode for the lithium secondary battery according to claim 1, wherein the additive is contained in an amount of 0.01 wt. % to 5 wt. % based on the total weight of the solids of the slurry composition for positive electrode.

5. The slurry composition for positive electrode for the lithium secondary battery according to claim 1, wherein the solvent may comprises one or more selected from the group consisting of an organic solvent and an aqueous solvent,
   wherein the organic solvent comprises one or more selected from the group consisting of N-methyl-2-pyrrolidone (NMP), methoxy propyl acetate, butyl acetate, glycol acid, butyl ester, butyl glycol, methyl alkyl polysiloxane, alkylbenzene, propylene glycol, xylene, monophenyl glycol, aralkyl-modified methylalkylpolysiloxane, polyether-modified dimethylpolysiloxane copolymer, polyether-modified dimethyl polysiloxane copolymer, polyacrylate, alkylbenzene, diisobutyl ketone, organically modified polysiloxane, butanol, isobutanol, modified polyacrylate, modified polyurethane, and polysiloxane modified polymer, and
   wherein the aqueous solvent comprises water.

6. The slurry composition for positive electrode for the lithium secondary battery according to claim 1, wherein the positive electrode active material comprises one or more selected from the group consisting of elemental sulfur ($S_8$), $Li_2S_n$ (n≥1, n is an integer), organic sulfur compound, and carbon-sulfur polymer [$(C_2S_x)$ n, 2.5≤x≤50, n≥2, x and n are integers].

7. The slurry composition for positive electrode for the lithium secondary battery according to claim 1, wherein the slurry composition for positive electrode has a thixotropy index (T) of 0.1 to 0.4.

8. A positive electrode for a lithium secondary battery comprising:
   a positive electrode current collector; and
   a positive electrode active material layer formed on one surface of the positive electrode current collector,
   wherein the positive electrode active material layer is formed of the slurry composition for positive electrode of claim 1.

9. A method for manufacturing a positive electrode for a lithium secondary battery, comprising the steps of:
   (S1) coating the slurry composition for positive electrode of claim 1 on one surface of a positive electrode current collector;
   (S2) drying the coating layer formed in step (S1); and
   (S3) pressing the coating layer to form a positive electrode active material layer.

10. The method for manufacturing a positive electrode for a lithium secondary battery according to claim 9, wherein the coating step (S1) is performed by one or more methods selected from the group consisting of a bar coating method, a roll-to-roll coating method, a spin coating method, a nozzle printing method, an inkjet printing method, a slot coating method, and a dip coating method.

11. A lithium secondary battery comprising:
    the positive electrode according to claim 8,
    a negative electrode,
    a separator, and
    an electrolyte solution.

12. The lithium secondary battery according to claim 11, wherein the lithium secondary battery is a lithium-sulfur secondary battery.

13. A battery module comprising the lithium secondary battery according to claim 11.

14. A device comprising the lithium secondary battery according to claim 11.

15. The device of claim 14, wherein the device is selected from the group consisting of a power tool; an electric car; an electric motorcycle; an electric golf cart; and a power storage system.

* * * * *